Figure 9:
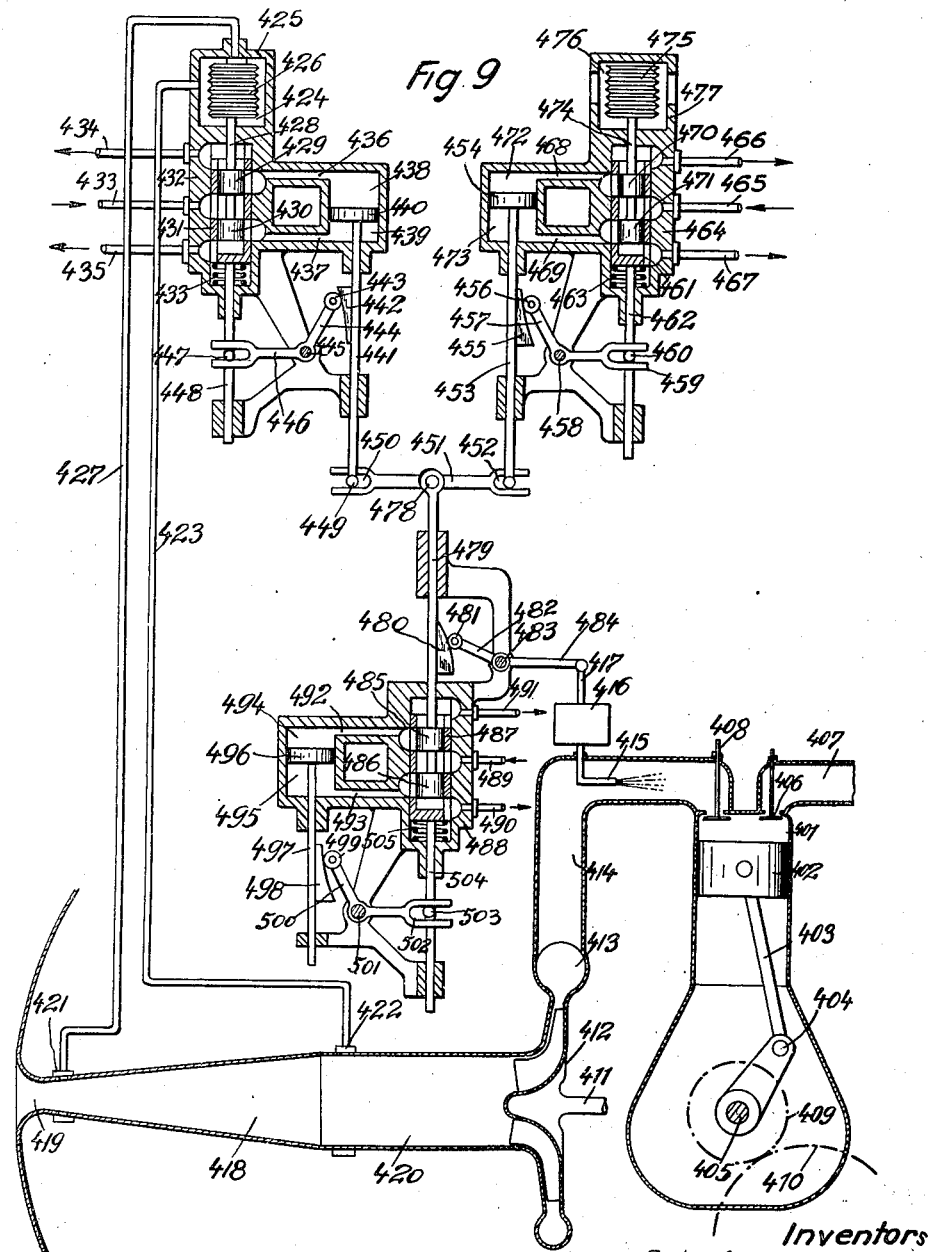

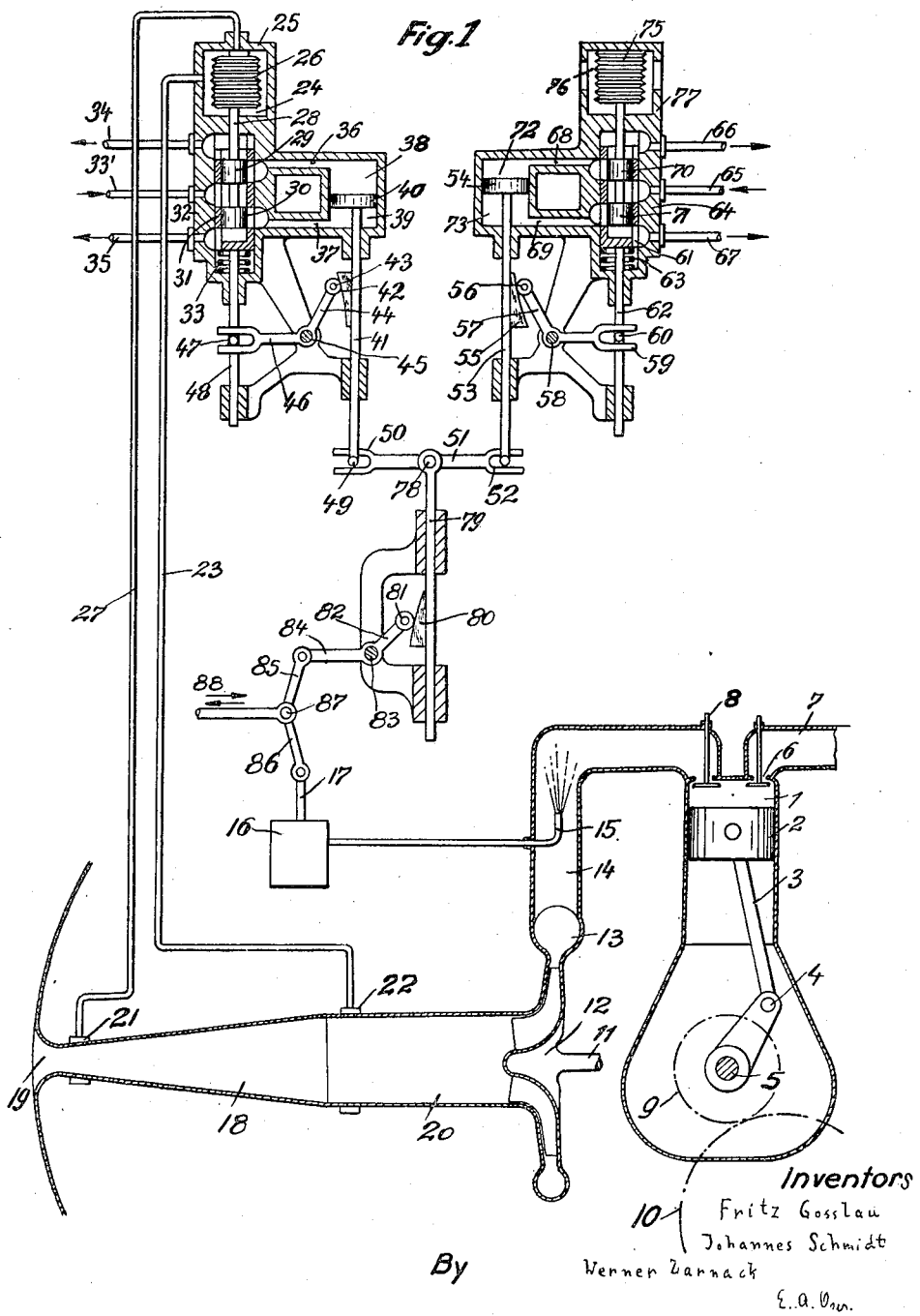

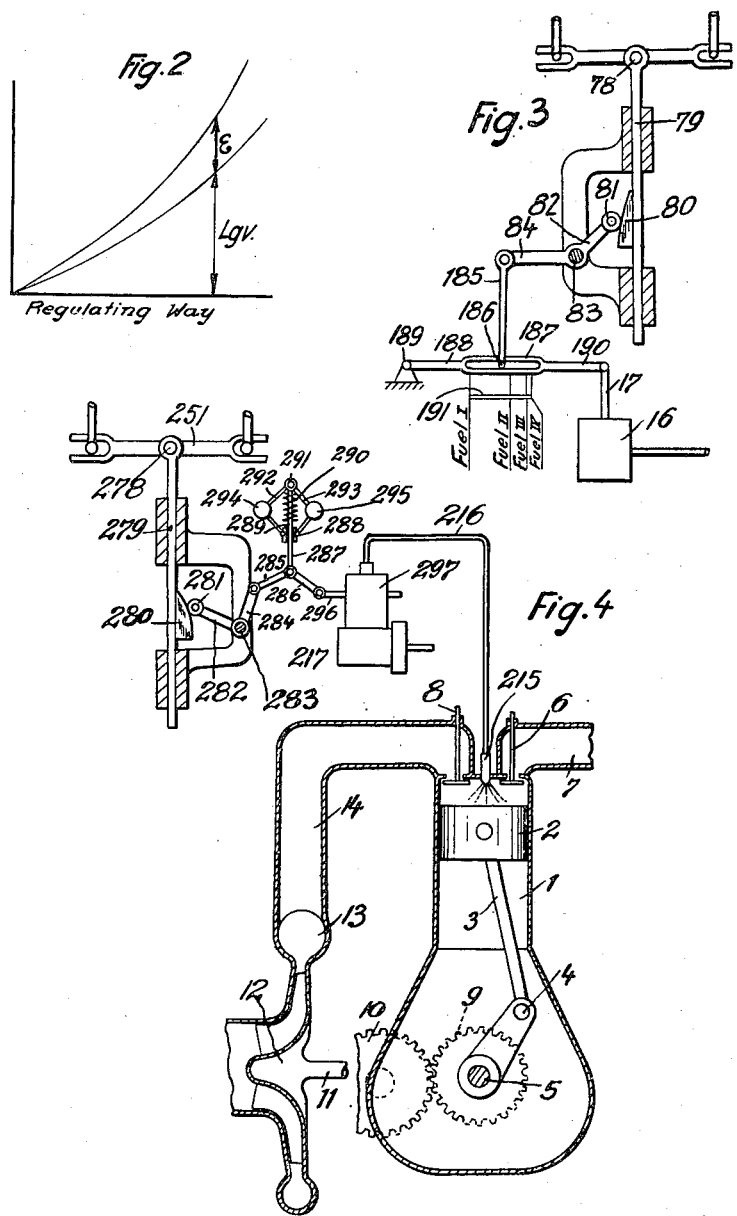

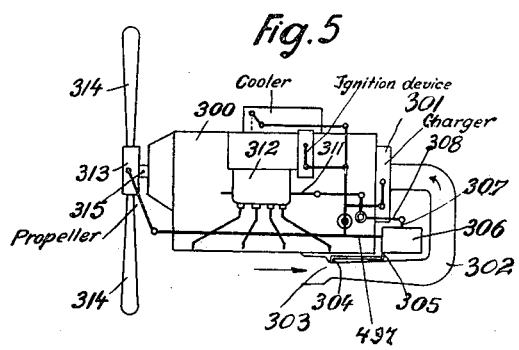
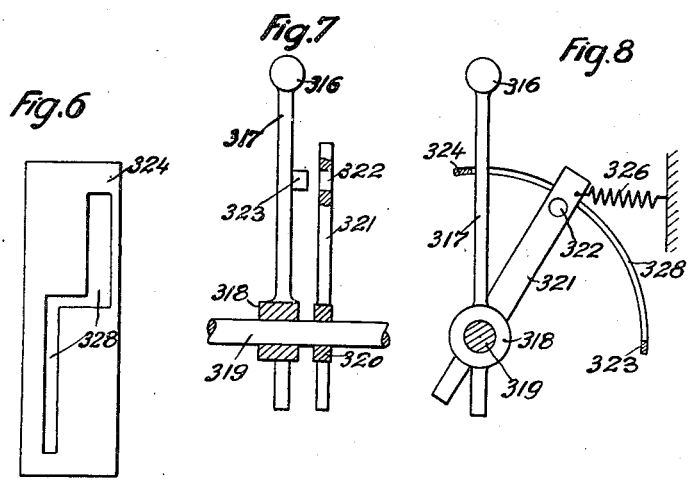

Patented Aug. 14, 1945

2,382,707

UNITED STATES PATENT OFFICE 2,382,707

DEVICE FOR REGULATING INTERNAL-COMBUSTION ENGINES

Fritz Gosslau, Berlin-Charlottenburg, Johannes Schmidt, Berlin - Eichkamp, and Werner Zarnack, Berlin - Charlottenburg, Germany; vested in the Alien Property Custodian Original application October 7, 1938, Serial No. 233,728, now Patent No. 2,297,213, dated September 29, 1942. Divided and this application May 20, 1941, Serial No. 394,324. In Germany October 8, 1937

11 Claims. (Cl. 123—178)

The present invention relates to a device for regulating internal combustion engines and additional devices, such as the ignition device, cooling devices, the auxiliary motor for the charging device, adjustable or self regulating propellers, and regulators for controlling the amount of fuel, the regulators being connected to the internal combustion engine and forming a driving unit therewith.

This application is a divisional application based upon certain subject matter contained in our prior copending application Serial No. 233,728, filed October 7, 1938, which has matured into Patent No. 2,297,213, issued September 29, 1942.

The device according to the invention is adapted to serve various purposes.

For instance, the regulation of those devices the optimum position of which changes in accordance with the engine efficiency, is to be automatically effected in dependence on the weight of the air fed in the unit of time.

Accordingly, it is an object of the invention to provide for an automatic regulation in dependence on the weight of the air fed in the unit of time of such devices that are automatically adjusted to their optimum position in accordance with the engine efficiency.

A further object of the invention is to provide a device which allows a particularly favorable utilization of the fuel reserve of the engine. A regulating device of this type has, for instance, the advantage that aircraft provided with such regulators have a range of flight which is greater than with the use of the hitherto known regulating devices.

A still further object of the invention is to provide a regulating device which operates under all service conditions free of objection and this also, as is required for instance at aircraft arts, in a very great height above the earth.

Another object of the invention is to provide a device which seldom or never requires operation of the pilot.

The regulating device according to the invention, moreover, is adapted also for use in aircraft provided with variable pitch propellers.

Furthermore, the regulating device maybe so constructed that the various regulating actions aimed at may be obtained independent of the state of the air.

The hitherto known means for regulating internal combustion engines and additional devices connected thereto generally are satisfactory only for some of the above mentioned requirements.

Now, we have found that all the above mentioned requirements may be fulfilled in a very simple manner by providing a device which operates in dependence on the weight of the air fed in a unit of time during charging and which controls the internal combustion engine as well as any number of additional devices in dependence on the weight of air fed in a unit of time.

The regulator according to the invention may be connected to the ignition device of the internal combustion engine for controlling the time of ignition. It is also feasible to connect the regulator to the cooling apparatus of that internal combustion engine for controlling the amount of cooling medium, or to the adjusting members of an adjustable or self regulating propeller coupled to the internal combustion engine for adjusting the pitch of the propeller blades.

A preferred use of the regulating device consists in connecting the measuring instrument operating in dependence on the weight of the air supplied in a unit of time to regulating means influence the quantity of fuel fed in a unit of time.

Eventually, the same regulator may simultaneously control the feed of the fuel and the drive of an auxiliary motor for the charging device, of coolers, ignition devices, adjustable propellers clutched to the engine and so on.

We have, furthermore, found, that for carrying into effect the general inventive idea consisting in utilizing the weight of the air drawn in and dealt with in a unit of time for regulating the various devices it is preferable to start from the following mathematical-physical relation:

$$G = C \cdot \sqrt{\frac{\Delta p}{v}}$$

wherein $G$ is the weight of the air, $C$ is a dimension constant, $\Delta p$ is the difference of certain pressures of the air in the suction pipe and $v$ is the state of the air, i. e. its specific volume, at one of the points of the pressure differences.

It is also possible to start from the following relation:

$$G = C \cdot \sqrt{\frac{\Delta p \cdot p}{R \cdot T}}$$

wherein $G$ is the weight of the air, $C$ is a dimension constant, $p$ is the pressure of the air, $R$ is the gas constant, $T$ is the absolute temperature, and $\Delta p$ is the air pressure difference referred to above.

If the regulator is to operate according to the last mentioned mathematical relation, it is recommendable for producing the pressure differences to use a partially restricted tube, for instance a Venturi nozzle, inserted in the suction pipe. The specific volume $$\frac{R.T}{p}$$

preferably is measured with the aid of a vacuum diaphragm bellows arranged in the air current and is then converted into corresponding control movements.

Instead of the Venturi tube any other well-known measuring instrument may be used. However, Venturi tubes have the advantage that practically no throttle losses occur.

For carrying into effect the above mentioned mathematical-physical relations preferably curve discs, cams or the like are provided, the control surfaces of which are formed according to a logarithmic and a number value law respectively. By means of such curve discs or cams, the values of the quotient may be converted into values of the sum and into values of differences, respectively, so that for instance auxiliary devices provided with balance beams may be used upon the arms of which act the pressures to be superimposed.

Further features and capabilities of the present invention will be apparent from the following description of the various modifications taken in connection with the drawings.

Various modifications are diagrammatically illustrated by way of example only in the drawings, wherein:

Fig. 1 is a diagrammatic representation of a construction of a regulator for controlling the fuel spray pump, Fig. 2 is a diagram relating to the regulation, Fig. 3 is a diagrammatic repersentation of a detail of the construction of Fig. 1 wherein a gate is provided for adjusting the arrangement to the use of different fuels, Fig. 4 is a diagrammatic representation of a portion of a regulator construction in which a centrifugal regulator serving as an additional regulating element is positively driven by the internal combustion engine, Fig. 5 is an elevation of an internal combustion engine coupled to a propeller having adjustable blades, Figs. 6, 7 and 8 are a plan view, a side elevation and a front elevation, respectively, of details of a special coupling device for the regulator of Figs. 4 and 5, and Fig. 9 is a diagrammatic representation of a regulator arrangement particularly adapted for regulating the ignition of an aircraft engine, the position of the flaps of the aircraft controlling the flow of cooling air, the pitch of the propeller and the like.

In one of the embodiments shown in the drawings the measuring instrument serving as an actuator for the fuel regulation is designed and arranged to respond to the weight of air temporarily fed into the internal combustion engine. Accordingly, the pilot is completely relieved, and the device operates automatically and correctly, because the predetermined quantity of air required for the perfect combustion of a certain quantity of fuel is always supplied. Conversely, a definite weight of fuel per unit of time is allotted to a weight of air just used by the engine per unit of time.

The weight of the flowing gases or of the air may be measured according to the ordinary methods used in physics and in particular used in the ignition art. Preferably, a Venturi tube is used which is inserted in the suction pipe or air intake leading to the internal combustion engine.

For measuring the state of the air, i. e., its specific volume, preferably a diaphragm chamber containing air or a barometer or thermo-barometer operating on the same principle may be used.

When using the above mentioned measuring devices as actuator for the associated power converting members, which may be hydraulic pistons or the like, logarithmic curve discs form the return drive for the actuators. When such logarithmic curve discs are used, the power pistons move in accordance with the logarithm values of the cams.

The control members connected to the two measuring devices, which may be a Venturi tube and a bellows preferably are connected to a common balance beam or the like linkage which by way of a further curve disc acts upon the fuel regulator. Furthermore, a device may also be provided which may be actuated automatically or by hand and which allows adjustment of grade settings for the various operative conditions, as for instance half load, full load, overload, or for a definite number of revolutions of the engine. The adjusting device may substantially consist of a toggle lever system.

The embodiment of the invention shown in Fig. 1 further serves to solve the following problem.

In connection with the known single lever devices for adjusting aircraft engines it is usual to provide a position of the lever for cruising load corresponding to 80% of the full load at which the motor is driven with an excess of air, i. e. with a poor or weak mixture. Another position is provided for a 100% output, at which the motor operates with a very rich mixture. This arrangement is disadvantageous, because, if the aircraft is flying in great height and the engine, therefore, due to insufficient charging pressure, has 80% of its full efficiency or output only, and also in still greater heights the pilot must adjust the lever to the position corresponding to 100% output. Therefore in great heights the aircraft can only be driven with a rich mixture, notwithstanding the fact, that in such heights an aircraft engine during a long flight even with the greatest charging pressure could substantially more economically be driven with a poor mixture.

To obviate these drawbacks the device according to the invention is so constructed that as long as the quantity of air drawn in and therefore the engine output or efficiency remains below a predetermined value of the full output, a poor mixture and with increasing output a gradually richer mixture is supplied. The formation of the mixture, therefore, is according to the invention no longer dependent on the position of the efficiency lever, but on the quantity of fuel mixture consumed by the engine. In this manner the pilot may choose any desired charging pressure in a height in which the engine at the very best draws in 80% of the total quantity of air only. The pilot will fly in any case with a poor or weak mixture. To allow the pilot to set a richer mixture in special cases, for instance when fighting, a second lever may be provided in the linkage for influencing the formation of the mixture, or the efficiency lever may be brought into a 110% position in which it allows supply of a richer mixture.

In the embodiment shown in Fig. 1 one cylinder 1 of the motor or any other internal combustion engines only is represented. The engine is preferably an aircraft motor. Piston 2 is moved up and down in cylinder 1 and is connected by means of piston rod 3 to crank 4 of crank shaft 5. Cylinder 1 is provided with outlet valve 6 connected to a pipe leading to exhaust 7. Inlet valve 8 is provided in cylinder 1. Gear wheel 9 is mounted on shaft 5 and engages gear wheel 10 on shaft 11. Shaft 11 carries rotor 12 of a centrifugal blower serving as charging device. Fixed casing 13 of the charger is connected by way of pipe 14 to inlet valve 8 and serves to supply combustion air under pressure. Spray nozzle 15 for the fuel extends into pipe 14. Nozzle 15 is connected to fuel pump 16 constructed as a geared pump, the construction of which is well known and therefore need not be described. The quantity of fuel fed by pump 16 is regulated by lever 17 acting upon a well known control valve of the pump not shown in the drawings.

Air flows into centrifugal blower 12, 13 by means of Venturi tube 18 open to the outer relative air current and having a narrow discharge end 19. Venturi tube 18 flares like a diffusor towards the charger up to the width of inlet socket 20. Tapping points 21 and 22 are provided at the smallest and at the widest part respectively of Venturi tube 18. Tapping 22 is connected by way of pipe 23 with the interior space 24 of chamber 25. Diaphragm box 26 formed by a corrugated tube is arranged in the interior space 24 and closed against the outer atmosphere. The interior of diaphraggm box 26 is by means of pipe 27 connected to tapping 21. The difference of pressure occurring at the two tapping points 21 and 22 of Venturi tube 18 due to the flow of air causes expansion and contraction respectively of diaphragm box 26. Rod 28 is rigidly connected to diaphragm box 26 and is actuated by the contraction and expansion movements of diaphragm box 26. Two pistons 29, 30 are mounted on rod 28 and are shiftably arranged in sleeve 31 which in turn is movably arranged in cylinder 32. Spring 33 tends to press sleeve 31 upwardly. Inlet pipe 33' and two outlet pipes 34, 35 for pressure oil are connected to cylinder 32. Cylinder 32 is furthermore connected by way of channels 36, 37 to chambers 38, 39 which are arranged above and below piston 40 repectively. Piston 29 and piston 30 effect in a well-known manner the supply and the discharge of pressure oil into and out of the chambers 38 and 39 respectively, whereby piston 40 is moved upwardly or downwardly. Besides from the position of pistons 29, 30 the admission and discharge of the pressure oil also depends on the position of sleeve 31 and on the position of the openings provided in sleeve 31. Piston rod 41 carrying cam 42 is connected to piston 40. Cam 42 is in the form of a logarithmic curve. Roller 43 bearing against cam 42 is provided at one arm 44 of a bell-crank pivotally mounted on bolt 45. The end of the other arm 46 of this bell-crank is fork-shaped and engages pin 47 provided at rod 48 rigidly connected to sleeve 31. In this manner piston 40 controls sleeve 31 in a logarithmic ratio according to the pressure difference of tapping point 21, 22. Spring 33 tends to always press roller 43 against curve 42.

The lower end of rod 41 carries pin 49 engaging fork 50 of balance beam 51 and acting upon the latter. Upon the other arm of balance beam 51, also having fork-shaped end portions 52, acts piston rod 53 controlled by piston 54. Piston rod 53 also carries curve 55 in the form of a logarithmic curve which, however, extends in the reverse direction with regard to curve 42. Against curve 55 bears by means of roller 56 the one arm 57 of a bell-crank pivoted on bolt 58. The other fork-shaped arm 59 of the bell-crank engages pin 60 of rod 62 rigidly connected to sleeve 61. Sleeve 61 is shiftably arranged in cylinder 64 against the action of spring 63. Cylinder 64 is provided with inlet pipe 65 and two outlet pipes 66, 67 carrying pressure oil. On the other side of cylinder 64 channels 68, 69 are provided which in accordance with the position of sleeve 61 and of pistons 70 and 71 slidably arranged in sleeve 61 effect the admission and discharge of pressure oil into and out of chambers 72, 73 arranged above and below piston 54, respectively. Pistons 70, 71 are fixed to piston rod 74 connected to diaphragm box 75 formed by a corrugated tube. Piston rod 74 is controlled by the expansion and contraction movements of box 75. Box 75 is closed against the outer atmosphere and contains a definite weight of air, whereas atmospheric pressure prevails in space 76 of chamber 77, surrounding diaphragm box 75, so that expansion and contraction of box 75 occurs in dependence on the state of air prevailing at a given time.

Rod 39 is linked to the center 78 of balance beam 51. Since piston 40 due to the control of sleeve 31 transfers to balance beam 51 the logarithm value of the pressure difference at the two measuring points 21, 22 while piston 54 transfers to balance beam 51 the negative logarithm value of the state of the air, a displacement of rod 79 results corresponding to half the difference of the logarithm value of the pressure difference and the logarithm value of the state of the air. Rod 79 carries another push curve 80 which introduces into the calculation the constants and the number value of the above mentioned formula.

Curve 80 is, moreover, so formed that, as long as the amount of aid drawn in and, therefore, the engine output remains below a predetermined value, for instance 80% of the full load, a poor mixture is supplied, whereas at a higher output a mixture gradually becoming richer is supplied. Against curve 80 bears by means of roller 81 the one arm 82 of a bell-crank pivoted at 83, the other arm 84 of the bell-crank being connected to toggle lever. The toggle lever consists of two links 85, 86. Lever 88 is connected at the connecting point of links 86, 86 and may effect different positions of toggle lever 85, 86. The free end of link 86 is connected to lever 17, and thereby influences as described above the quantity of fuel delivered by fuel pump 16. Lever 88 may be actuated by a pilot. This either is effected by connecting lever 88 to an emergency lever which is pulled by the pilot in special cases, for instance during fighting, only to allow an enrichment of the mixture in great heights also. Or else by connecting lever 88 to the efficiency lever so that by shifting the latter into the 110% position the toggle lever linkage is influenced and thereby an enrichment of the fuel mixture is effected.

The automatic regulation of the adjustment to a poor and rich mixture, respectively, independence on the mixture dealt with in the engine is effected by the shape of cam 80, whereas the additional arbitrary control of the mixture is effected by lever 88.

In connection with the above mentioned devices for regulating the fuel supply in dependence on the weight of the air, the latter may be represented by the following formula:

$$G = F \cdot \sqrt{2g} \cdot \alpha \cdot \epsilon \sqrt{\frac{\Delta p}{v}}$$

Whereas the accessory value $\alpha$ has quite an unimportant influence on the measuring exactness of the Venturi tube and quickly approaches a constant value with increasing height of flight, the indication by the accessory expansion value $\epsilon$ of the Venturi tube is disturbed in an increasing degree with increasing height of flight. It has been ascertained by tests, that between 0 and 5 kilometers of height the value of $\epsilon$ for a definite weight of air was reduced for about 3.5%.

To compensate this defect, the influence of the variable value of $\epsilon$ is according to the invention taken into consideration. For this purpose preferably the regulator which is controlled by the alteration of the specific weight of the air is used. This correction is effected by superimposing the control curve of return sleeve 61 of the regulator by the curve for the variable value $\epsilon$. Hereby the amplitude of the regulator depending upon the specific volume of the air increases with increasing height not only in proportion to the increase of the specific volume of the air, but additionally in proportion to the alteration of the value $\epsilon$.

An example of this modified construction according to the invention is shown in Fig. 1 in connection with Fig. 2 which graphically represents the curve of the value of $\epsilon$ mentioned above and of the logarithm of $v$ in dependence of the way of regulation.

In this modified regulator construction piston rod 53 carries a curve 55 which according to Fig. 2 consists of a logarithmic curve corresponding to the expansion characteristic of the box 75, whereby a curve, shaped in accordance with the alteration of the expansion accessory value $\epsilon$ is superimposed to this characteristic. Here curve 55 also extends in the reverse direction with regard to curve 42.

Since piston 40 due to the control of sleeve 31 transfers to balance beam 51 the logarithm value of the pressure difference prevailing at the two tapping points 21, 22, while piston 54 transfers to balance beam 51 the negative logarithm value of the state of air under consideration of the value $\epsilon$, rod 79 is displaced so that this displacement corresponds to half the difference of the logarithm value of the pressure difference and of the logarithm value of the pressure difference and of the logarithm value of the state of the air under consideration of the value $\epsilon$.

Lever 88 again may be actuated by the pilot. This is effected either by connecting lever 88 to an emergency lever which is pulled by the pilot in special cases, for instance during fighting, only to allow an enrichment of the mixture in greater heights also. Or else lever 88 may be connected to the efficiency lever in such a manner that the shifting of the efficiency lever into the 110% position influences the toggle lever linkage and thereby enriches the fuel mixture.

The value $\epsilon$ depends besides of the height of flight on the load of the motor also. The modification shown and described neglects the alteration which per se is required when the motor load changes. Strictly speaking, therefore, this modification is correct for a definite motor output only. Practically, however, an additional correction in accordance with changes of the motor output, may be obviated, since the correction made is not very great itself and, moreover, is of importance within the limited ranges of the motor output during cruising speed only. If a complicated additional regulation in accordance with the motor output is to be prevented, it may evidently be included in the bargain that certain deviations occur at full load and when the motor runs idle.

Another modification of the present regulator has the advantage, that it may be used for the most different fuels and may very quickly be regulated to the quantity of air required for the particular fuel used. For this purpose, a device for arbitrarily adjusting the quantity of fuel to be supplied is provided in connection with the automatic regulator.

Preferably, this device consists therein that the length of one or more of the lever arms of the regulator linkage is adjustable, one lever of the linkage being provided with a gate in which the pivot point of another lever is arbitrarily shiftable and fixable in any desired position. The arbitrarily adjustable portion of the regulator preferably is connected to an indicating device which indicates on a scale that quantity of fuel which corresponds to the optimum mixing ratio of the fuel in question.

For this device, the construction shown in Fig. 1 may advantageously be used in which between bell-crank 82, 84 on the one hand and fuel pump 16, 17 on the other hand an adjustable device, for instance a device as shown in Fig. 3, is inserted. Otherwise the construction of the regulator may be exactly the same as the one shown in Fig. 1.

Rod 79 carries push curve 80 against which bears by means of roller 81 lever arm 82 pivotally arranged at 83. The other lever arm 84 of this bell-crank acts upon link 185. The other end of link 185 is provided with pin 186 which engages gate 187 in which it may be arbitrarily adjusted and fixed in any desired position. Gate 187 is carried by lever 188 linked to the casing at 189. The other end 190 of lever 188 acts upon lever 17, whereby the quantity of fuel injected by fuel pump 16 is regulated in a well-known manner.

Scale 191 is provided adjacent gate 187. Scale 191 bears the marks for the most favorable adjustment of the air-fuel mixture for different kinds of fuel. So for instance, a mark may be provided for each kind of fuel. Therefore, when changing from one fuel to another it is only necessary to adjust the pivot point 186 of link 185 in gate 187 to that mark which designates the fuel now to be used. Then the motor is at once adapted and without the necessity to effect further time-consuming regulations to operate with the new fuel under the most favorable conditions with regard to the fuel-air mixture.

In a further modified construction the measuring of the weight of the air drawn in and dealt with in the engine in a unit of time is utilized for influencing certain regulator members. This construction is particularly adapted for aircraft engines used to drive propellers and represents the followng improvement.

In known devices of this type a definite position of a switch lever is provided for each weight of air, and the quantity of fuel supplied depends on the position of the switch lever. Frequently the pressure of a pump for injecting fuel, for instance into the mixing chamber, is influenced by the regulator. The regulator then correctly operates as long as the fuel pump driven by the engine maintains constant the injection pressure chosen independent of the prevailing engine speed.

Supposing a regulator wherein the weight of air measured in each unit of time is utilized as impulse cooperates with a pump feeding the fuel in dependence of the engine speed and provided with a regulator for the fuel fed, the regulator being provided with an adjustable regulator member and the pump feeding a definite quantity of fuel determined by the number of revolutions of the engine and the setting of the regulator member. Very unfavorable operating conditions result in this case if an aircraft is to be driven by an engine having different numbers of revolutions with an equal output, i. e. with an equal weight of air.

Such conditions prevail if an aircraft provided with a so-called non-adjustable propeller changes from horizontal flight to climbing. When climbing, the number of revolutions of the engine decreases with regard to the number of revolutions of the engine during horizontal flight. This is due to the low pitch of the propeller. Hereby the feed of the pump is reduced for the same position of the regulator rod so that the correct mixing ratio for the horizontal flight becomes too poor for climbing.

The reverse proportions for instance occur, if the aircraft is pushed or falls. Generally speaking, an undesired change of the mixing ratio occurs with each change of the velocity of the aircraft and with an equal motor output. This is due to the fact that the mixture regulator acts according to a certain time (hourly weight of air), the pump, however, acts on the individual cycle of operation.

The above described difficulties are obviated according to the invention in a simple manner by providing a special regulator. This special regulator is driven in dependence of the number of revolutions of the engine and influences the actual values of the regulation effected by the regulator responding to the quantity of air dealt with in a unit of time so that at all operating conditions the corresponding calculated mixing ratio of air and fuel is warranted. For instance a centrifugal regulator driven by the internal combustion engine is connected by way of its control member to the regulator for the fuel fed by the pump and influenced by the air dealt with in the engine in such a manner that it influences a valve member controlled by this regulator and provided in the fuel pipe.

According to the invention such a device is so constructed that the regulating value of the meter for the air fed into the engine may be corrected in dependence of the engine speed.

According to another modification of the present invention the regulator influenced in dependence of the number of revolutions of the engine is formed as a regulator for the adjustable propeller. the shaft of which is positively coupled to the drive shaft of the pump feeding the fuel. This regulator automatically adjusts itself to a constant number of revolutions in a manner known per se. The special advantage of this construction consists therein that with the use of adjustable propellers provided with regulators for the number of revolutions, it is not necessary to provide a special regulator which for instance corresponding to the construction previously described acts on the control rod for the fuel pump. With this last described construction with adjustable propeller the regulator provided for the propeller effects the regulation of the fuel feed aimed at. The fuel pump needs to be regulated according to the temporary quantity only of the consumed air since the number of revolutions of the pump is perfectly constant.

A further modification of the present invention is particularly adapted for aircraft engines with adjustable propellers operating in two spaced ranges. When using such adjustable propellers the difficulty may occur similar to that arising in connection wtih fixed propellers, i. e. that the mixing ratio always will be richer at the higher number of revolutions of the engine than at the lower number of revolutions. This difficulty may according to the invention be overcome by the fact that the regulator, influenced in dependence on the number of revolutions, is arranged as a regulator for the propeller automatically setting to a plurality of constant number of revolutions. Furthermore, control means, for instance correspondingly shaped curve discs, are provided which on setting a range of higher number of revolutions simultaneously and automatically effect an enrichment of the mixture of fuel and air. For example, the second range of number of revolutions of the propeller is chosen so much higher than the first range that the change of the number of revolutions just results in an enrichment from the cruising mixture to the heavy duty mixture. This construction of the regulating device also is characterized by a particularly great simplicity.

When constructing and using the last described device, the regulator is once set to a definite mixing ratio as poor as possible and determined for cruising speed. At the lower number of revolutions this mixing ratio then remains constant at each position of the so-called pilot lever as far as to the 100% position. Only if the propeller is switched to the higher number of revolutions an enrichment also is positively effected so that the engine operates with highest efficiency.

Preferably, the switch lever for the propeller is positively coupled to the pilot lever in such a manner that, on shifting the pilot lever from the 80% position to the 100% position, the propeller also is adjusted to the higher number of revolutions. This modification of the device has the special advantage that by means of a single lever the enrichment as well as the increase of the number of revolutions may be effected. As for the two ranges of operation two ignition points only are required. The device may be improved further by also coupling the switching gear of the ignition device, preferably in the same manner, to the above described multiple switching lever.

Preferably, the various levers are rotatably mounted upon a common shaft and are movably arranged in a common gate provided for engaging and disengaging the levers.

With the present device provided with a regulator for the fuel fed by the fuel pump which may be influenced by pressure differences prevailing in an air measuring device actuated by the engine, the regulator is coupled to an auxiliary regulator. This auxiliary regulator is influenced by alterations of the state of the outer atmosphere, for instance on account of different heights above the earth and correspondingly controls so that the regulating movements of the first regulator are compensated.

As an example of the last described regulating device the construction described in connection with Fig. 1 may again be used, certain regulating members and devices being constructed and arranged in accordance with Fig. 4.

Spraying nozzle 215 is not provided in the air suction pipe leading to the cylinder, but in the cylinder cover. Supply pipe 216 for the fuel is connected to nozzle 215. The other end of pipe 216 is connected to the outlet socket of feed pump 297 which may be a geared pump.

By means of roller 281 lever arm 282 of a bell-crank pivoted on bolt 283 bears against curve 280. The other arm 284 of the bell-crank is fixed to a toggle lever consisting of two links 285, 286. Lever 287 acts as the connecting point of link 285, 286. Axially displaceable member 288 for instance a sleeve, is arranged on lever 287.

Two weights 294, 295 of a centrifugal regulator bear against member 288. Spring 290 tending to move sleeve 288 downwardly bears against rod 289 fixed to sleeve 288 and displaceable axially with sleeve 288. Spring 290 bears with its other end against link 291 on which two arms 292, 293 are pivoted carrying weights 294 and 295, respectively.

As may be seen from Fig. 4, weights 294, 295 of the centrifugal governor 287, 295 driven by the internal combustion engine 1—5 are swung outwardly at higher number of revolutions of the engine so that sleeve 288 is drawn upwardly and therewith link 287 of toggle linkage 285, 286 also is moved upwardly, whereby the length of the linkage is decreased. Consequently, a pull is exerted on regulator rod 296 which tends to withdraw rod 296 from regulator casing 297. The amount of adjustment effected hereby depends on the control movements of bell-crank 282, 284, influenced by curve disc 280, besides being dependent on the control movements of the centrifugal governor. According to the invention the various cooperating gear members are so dimensioned and arranged that the feed movement of regulator rod 296 is compensated again by bell-crank lever 282, 284 by shortening toggle lever system 285, 286 acted upon by the centrifugal governor.

In the construction shown in Fig. 5 the engine block of the internal combustion engine is designated with 300. Pipe 302 is connected to the rear part 301 of the casing. The other end of pipe 302 ends in Venturi tube 303, the open mouth of which faces the relative air current which flows into the mouth as indicated by the arrow. Tappings 304 and 305 are provided on Venturi tube 303 in the same manner as tappings 21 and 22 described in connection with the construction shown in Fig. 1. Pipes connected to tappings 304, 305 lead to regulator 306 which is constructed in a well-known manner and measures the weight of the quantity of combustion air drawn in. Rod 307 projects from regulator 306 which is by means of a link, connected to a further rod 308 which in turn is by a link connected to rod 309. Rod 309 is connected by a link to rod 310 which preferably also acts by way of a link upon rod 311 formed as a regulating rod of fuel pump 312 and movably arranged in the casing of pump 312.

Regulator 313 controlling the number of revolutions is mounted in adjustable propeller 314 journalled upon shaft 315 and driven by the internal combustion engine 300. Regulator 313 is according to the invention so constructed as to change the position of the blades of the propeller in such a manner that the driving engine always rotates with a constant number of revolutions.

Figs. 6–8 illustrate by way of example the coupling of the pilot lever to the selecting lever for the adjustment of the various ranges of numbers of revolutions of the propeller. 316 is the handle of pilot lever 317. The two levers 317 and 321 bear by means of hubs 318 and 320, respectively, against a common pivot 319. Recess 322 facing lever 317 is provided in lever 321. Projection 323 of lever 317 may engage with recess 322 to couple the two levers 317, 321.

The so-called pilot lever as well as the selecting lever for the number of revolutions of the adjustable propeller are movable in common slide 324 provided with slot 325.

As may be seen in Figs. 6 and 8, pilot lever 316, 317 may be moved in slot 325 of slide 324 from point a over b to c, then to d and finally to e. In the positions a and e lever bears against stops which are formed by slot 325 of slide 324.

a designates the idle running position, b and c designate the cruising positions corresponding to 80% of the nominal output, while d is the position for the nominal output and e is the position for take off output.

On shifting pilot lever 316, 317 from the position c to the position d and e selecting lever 321 is entrained by nose 323 which engages with recess 322. Hereby selecting lever 321 is moved from the position c (see also Fig. 5) which corresponds to the low number of revolutions of the propeller into the positions d and e which correspond to the high number of revolutions.

If levers 316, 317 and 321 are not coupled to each other, selecting lever 321 always is maintained in the position c by means of spring 326, whereas pilot lever 316, 317 may be maintained in any desired position.

Another modification of the present device has the advantage that it may be used for controlling the quantity of the fuel and also for controlling auxiliary devices of the internal combustion engine, as for instance the ignition device, the cooling apparatus, the adjustable propeller and so on. The device is constructed to also operate under the following operating conditions.

If for instance an aircraft is flying in a height substantially above the so-called full pressure height, the engine supplies a certain portion of its full efficiency only due to the reduction of the charging pressure. Supposing for instance, the motor only supplies 50% of its full power during the time the pilot lever occupies the 100% position very unfavorable conditions result in connection with the known devices. For instance, the cooling flaps are completely opened, whereas the engine only supplies half of its full power so that the engine is strongly cooled down and the speed of the aircraft is unnecessarily reduced. Also the time of ignition can not be correctly adjusted as with the 100% position of the pilot lever the times of ignition favorable for full load are set, whereas due to the great height of the aircraft about 50% of the engine efficiency only may be obtained. The same is true for instance for the adjustment of the pitch of the propeller and the setting of other devices.

To obviate these defects, the regulating device according to the invention is so constructed that a time of ignition, different from that required for a smaller quantity of air fed, for instance corresponding to the cruising efficiency is automatically set, when larger quantities of air corresponding to a great engine efficiency are dealt with in a unit of time.

Also the blades of an adjustable propeller are set and the position of the louvers allowing discharge of the cooling air is regulated in such a sense that above a definite height of flight in which the engine cannot operate with highest efficiency because the amount of air drawn in in a unit of time is too small the cooling flaps cannot longer be completely opened.

In the modification shown in Fig. 9 by way of example only one cylinder 401 is represented of the internal combustion engine used. Piston 402 moves up and down in cylinder 401 and is connected by rod 403 to crank 404 of crankshaft 405. Outlet valve 406 of cylinder 401 is connected to pipe 407 leading to the exhaust, and inlet valve 408 is provided in cylinder 401. Gear wheel 409 is mounted upon shaft 405 and engages with gear wheel 410 mounted on shaft 411. Shaft 411 carries rotor 412 of a centrifugal blower serving as charger, the fixed casing 413 of which is connected by pipe 414 to inlet valve 408 and supplies valve 408 with combustion air under pressure. Nozzle 415 for injecting fuel extends into pipe 414. Nozzle 415 is connected to fuel pump 416 which is formed for example as a geared pump 416 the construction of which is known and, therefore, this pump need not be described in detail. The quantity of fuel fed by fuel pump 416 is controlled also in a well-known manner by lever 417 acting upon a control valve of the pump which also is well-known and, therefore, not shown in the drawings.

Air is supplied to centrifugal blower 412, 413 by Venturi tube 418 open to the relative air current. The discharge end 419 of Venturi throat 418 is narrow and flares like a diffusor towards the charger up to the width of inlet socket 420. At the smallest portion as well as at the largest portion of Venturi tube 418 tappings 421 and 422 respectively, are provided. Tapping 422 is connected by pipe 423 to the interior space 424 of chamber 425. Diaphragm box 426, formed by a corrugated tube is arranged in the interior space 424 closed against the outer atmosphere. The interior of bellows 426 is connected by pipe 427 to tapping 421. The pressure difference occurring at tappings 421 and 422 of Venturi tube 418 due to the flow of air effects an expansion or contraction of diaphragm box 426. Rod 428 is rigidly connected to bellows 426 and is actuated by its expansion and contraction movements. Two pistons 429, 430 are mounted in rod 428. Pistons 429, 430 are displaceably arranged in sleeve 431 which in turn is displaceably arranged in cylinder 432. An inlet pipe 433' and two outlet pipes 434, 435 for admitting and discharging pressure oil are provided in cylinder 432. Moreover, cylinder 432 is connected to chambers 438, 439 arranged above and below piston 440, respectively, by means of channels 436, 437. Pistons 429 and 430 effect in a well-known manner admission and discharge of pressure oil into and out of chambers 438 and 439, respectively, whereby piston 440 is moved upwardly or downwardly. The admission and discharge of the pressure oil, besides depending on the position of pistons 429, 430, depends on the position of sleeve 431 and the openings provided in sleeve 431. Piston rod 441 carrying cam 442 is attached to piston 440. Cam 440 is formed in the manner of a logarithm curve. Roller 443 bears against cam 440 and is carried by the one arm 444 of a bell-crank pivotally mounted on bolt 445. The other arm 446 of the bell-crank is fork-shaped and engages pin 447, provided on rod 448 rigidly connected to sleeve 431. In this manner piston 440 controls sleeve 431 according to a logarithm law. By means of spring 433 roller 443 is always pressed against curve 442.

The lower end of rod 441 carries pin 449 which engages fork 450 of balance beam 451 and acts upon the latter. Piston rod 453 controlled by piston 454 acts upon the other arm of balance beam 451 which also is formed with a fork-shaped end 452. Piston rod 453 carries curve 455 which also is formed in the manner of a logarithm curve which, however, extends in a reverse direction with regard to curve 442. Roller 456 bears against curve 455 and is carried by lever arm 457 of a bell-crank, pivotally mounted upon bolt 458. The other fork-shaped arm 459 of the bell-crank engages pin 460 which is provided on rod 462 rigidly connected to sleeve 461. Against the action of spring 463 sleeve 461 may be displaced in a cylinder 464 provided with an inlet 465 and two outlets 466 and 467 for pressure oil. Channels 468, 469 are provided on the other side of sleeve 461. According to the position of sleeve 461 and pistons 470, 471 displaceably arranged in said sleeve, channels 468, 469 effect the admission and discharge of pressure oil into and out of chambers 472, 473 above and below piston 454. Pistons 470, 471 are fixed to piston rod 474 attached to diaphragm box 475, formed by a corrugated tube. Pistons 470, 471 are controlled by the expansion and contraction movements of diaphragm box 475. Diaphragm box 475 is closed against the outer atmosphere and contains a definite weight of air, whereas atmospheric pressure prevails in space 476 of chamber 477 which surrounds diaphragm box 475 so that bellows 475 expands and contracts in dependence on the state of air at a given time.

Rod 479 is linked to point 478 in the middle of balance beam 451. As piston 440 due to the control of sleeve 431 transfers upon balance beam 451 the logarithm value of the pressure difference existing at the two measuring points 421, 422, while piston 454 transfers upon balance beam 451 the negative logarithm value of the state of air, a displacement of rod 479 results, corresponding to half the difference of the logarithm value of the pressure difference and the logarithm value of the state of air. Rod 479 carries a further push curve 480 which introduces into the calculation the constant and the root value of the formula $$G = C \cdot \sqrt{\frac{\Delta p}{v}}$$

referred to hereinbefore. The one arm 482 of a bell-crank pivoted on bolt 483 bears by means of roller 481 against curve 480, while the other arm 484 of the bell-crank acts upon lever 417. In this manner the fuel supply is effected in dependence on the actually consumed weight of air at a given time. Two pistons 485, 486 are mounted on rod 479. In correspondence to the position of rod 479, pistons 485, 486 are displaced in sleeve 487 shiftably arranged in cylinder 488. Pressure oil is admitted to and discharged from cylinder 488 by way of inlet pipe 489 and discharge pipes 490, 491. Sleeve 487 is provided with openings which substantially correspond to the openings of the cylinder. Cylinder 488 is connected by means of two channels 492, 493 to chambers 494, 495 arranged above and below piston 496, respectively, so that in a manner known per se the position of pistons 485, 486 as well as the position of sleeve 497 control the position of piston 496. Piston rod 497 carrying curve 98 is fixed to piston 496. Roller 499 mounted on arm 500 of a bell-crank pivoted at 501 bears against curve 98. The other arm 502 of the bell-crank is fork-shaped and engages pin 503 of piston rod 504 which bears against sleeve 487 and displaces the latter against the action of spring 505. Rod 497 acts upon a lever, not shown in the drawings, which in a manner known per se effects adjustment of the ignition device, adjustment of the cooling flaps or setting of the blades of a variable propeller. One and the same piston 496 may effect the adjustment of all adjustable devices, but separate devices also may be provided for adjusting each individual device.

By the above mentioned device not only the fuel supply but also the regulation of all devices, the optimum position of which changes in accordance with the engine efficiency, are directly controlled in dependence on the quantity of the fuel mixture consumed by the engine.

Although preferred embodiments of the regulating device have been disclosed in accordance with the present invention, it is to be understood that variations and modifications therein may be made coming within the broader spirit and scope thereof as defined in the following claims.

We claim:

1. In combination with an internal combustion engine, a controllable pitch propeller driven by said engine, a setting device for adjusting the pitch of said propeller, an ignition device for said engine, a fuel pump, a cooling apparatus for said engine, a charger comprising an air intake, an auxiliary motor for said charger, means for continuously measuring the weight of the air passing through said air intake, means to automatically control in accordance with the measured weight of the air said fuel pump, said setting device for setting the propeller pitch, said auxiliary charger motor, said cooling apparatus, and said ignition device, and means for operatively connecting said control means with each of said devices controlled thereby.

2. In combination with an internal combustion engine, a variable pitch propeller driven by said engine, a setting device for adjusting the pitch of said propeller, an ignition device for said engine, a fuel pump, a cooling apparatus for said engine, a charger comprising an air intake, an auxiliary motor for said charger, means for continuously measuring the weight of the air passing through said air intake, control means operating in accordance with the measured weight of the air, a regulating device connected with said control means and controlling in turn simultaneously said fuel pump, said setting device for adjusting the pitch of said propeller, said auxiliary charger motor, said cooling apparatus, and said ignition device, and means to operatively connect said regulating device with each of the devices to be controlled.

3. In combination with an internal combustion engine, a fuel pump, a charger having an air intake, said air intake comprising a Venturi tube, a balance beam comprising two arms, means to actuate one of said arms by the logarithmic value of the pressure difference of the air passing through the widest part and through the narrowest part of said Venturi tube, means to actuate the other of said arms by the negative logarithmic value of the variations in the specific volume of the air, a support connected with the fulcrum of said two arms, a controllable pitch propeller coupled to said engine, a centrifugal governor controlled by the number of revolutions of said engine and automatically controlling said controllable pitch propeller to a constant number of revolutions, a linkage connecting said support with said fuel pump, said governor further controlling said linkage, whereby the weight of the fuel delivered by said pump depends upon the weight of the air as well as on the number of revolutions of said engine.

4. In combination with an internal combustion engine, a fuel pump, a charger having an air intake, said air intake comprising a Venturi tube, a balance beam comprising two arms, means to actuate one of said arms by the logarithmic value of the pressure difference of the air passing through the widest part and through the narrowest part of said Venturi tube, means to actuate the other of said arms by the negative logarithmic value of the variations in the specific volume of the air, a support connected with the fulcrum of said two arms, a controllable pitch propeller coupled to said engine, a centrifugal governor controlled by the number of revolutions of said engine and comprising a mechanism for automatically setting said controllable pitch propeller to a pulrality of predetermined constant number of revolutions, a control means connecting said support with said fuel pump, the mechanism of said governor further controlling said control means, whereby on setting a range of higher number of revolutions said control means simultaneously and automatically controls said fuel pump to effect an enrichment of the fuel air mixture.

5. In combination with an internal combustion engine, a variable pitch propeller driven by said engine, a setting device for adjusting the pitch of said propeller, a charger having an air intake comprising a Venturi tube, a fuel pump, a balance beam comprising two arms, means to influence one of said arms by the pressure difference of the air passing through said Venturi tube, a bellows controlling the other of said arms, said bellows being influenced by the variations of the specific volume of the air, means to convert said two influences to the weight value of the air being proportional to the square root of said air pressure difference divided by said specific air volume, said means actuating a further control means in accordance with said air weight value, said further control means controlling said fuel pump, and said setting device for adjusting the pitch of said propeller, and means to operatively connect said further control means with each of said devices controlled thereby.

6. In combination with an internal combustion engine, a variable pitch propeller driven by said engine, a setting device for adjusting the pitch of said propeller, a charger having an air intake, said air intake comprising a Venturi tube, a fuel pump, a balance beam comprising two arms, a first linkage influenced by the pressure difference of the air passing through said Venturi tube, said first linkage controlling one of said arms, a second linkage, a bellows connected with said second linkage and controlling the other of said arms, said bellows being influenced by the variations of the specific volume of the air, said linkages including actuating cams, shaped according to a logarithm law, for converting the algebraic quotient of the square root of said air pressure difference divided by said specific volume to the difference between the logarithm of said pressure difference and the logarithm of said specific volume a rod connected with the fulcrum of said balance beam, said rod comprising a further cam formed in accordance with the number value for retransforming the logarithmically effected movements in movements according to the law of the air weight being proportional to the square root of said air pressure difference divided by said specific air volume, said rod controlling said fuel pump, and said setting device for adjusting the pitch of said propeller, said rod being operatively connected with each of said devices controlled thereby.

7. In combination with an internal combustion engine, a controllable pitch propeller driven by said engine, a setting device for adjusting the pitch of said propeller, a charger comprising an air intake, said air intake including a Venturi tube, an auxiliary motor for said charger, a fuel pump, a cooling apparatus for said engine, an ignition device for said engine, a balance beam comprising two arms, means to influence one of said arms by the pressure difference of the air passing through said Venturi tube, a bellows closed and filled with air influencing the other of said arms, said bellows being actuated in accordance with the specific volume of the air, means to convert said two influences to the weight of the air being proportional to the square root of said air pressure difference divided by said specific air volume, said last means actuating a further control means in accordance with said air weight, said control means controlling said fuel pump, said setting device for adjusting the pitch of said propeller, the auxiliary motor for said charger, said cooling apparatus, and said ignition device, and means to operatively connect said control means with each of said devices controlled thereby.

8. In combination with an internal combustion engine, a controllable pitch propeller driven by said engine, a setting device for adjusting the pitch of said propeller, a charger comprising an air intake, said air intake including a Venturi tube, an auxiliary motor for said charger, a fuel pump, a cooling apparatus for said engine, an ignition device for said engine, a balance beam comprising two arms, a first linkage influenced by the pressure difference of the air passing through said Venturi tube and controlling one of said arms, a second linkage, a bellows closed and filled with air and connected with said second linkage, said second linkage controlling the other of said arms, said bellows being actuated in accordance with the specific volume of the air, said linkage including actuating cams, shaped according to a logarithm law, for converting the algebraic quotient of the square root of said air pressure difference divided by said specific air volume to the difference between the logarithm of said pressure difference and the logarithm of said specific volume, a rod connected with the fulcrum of said balance beam, said rod having further cams formed in accordance with the number value for retransforming the logarithmically effected movements in movements according to the law of the air weight being proportional to the square root of said air pressure difference divided by said specific air volume, said rod controlling said fuel pump, said setting device for adjusting the pitch of said propeller, the auxiliary motor for said charger, said cooling apparatus, and said ignition device, and means to operatively connect said rod with each of said devices controlled thereby.

9. In combination with an internal combustion engine, a variable pitch propeller driven by said engine, a setting device for adjusting the pitch of said propeller, a charger having an air intake comprising a Venturi tube, an auxiliary motor for said charger, a fuel pump, a cooling apparatus for said engine, an ignition device for said engine, a balance beam comprising two arms, means to actuate one of said arms by the logarithmic value of the pressure difference of the air passing through the widest part and through the narrowest part of said Venturi tube, means to actuate the other of said arms by the negative logarithmic value of the variations in the specific volume of the air, a rod connected with the fulcrum of said balance beam and actuated thereby in accordance with half of the difference between the logarithmic value of said pressure difference and the logarithmic value of said specific air volume, said rod being connected with said fuel pump for controlling said pump, whereby the weight of the fuel is controlled in dependence upon the weight of the air, said rod being further connected with and controlling said ignition device, said cooling apparatus, said setting device for adjusting the pitch of said propeller, and said auxiliary charger motor.

10. In combination with an internal combustion engine, a variable pitch propeller driven by said engine, a setting device for adjusting the pitch of said propeller, a charger having an air intake comprising a Venturi tube, an auxiliary motor for said charger, a fuel pump, a cooling apparatus for said engine, an ignition device for said engine, a balance beam comprising two arms, means to actuate one of said arms by the logarithmic value of the pressure difference of the air passing through the widest portion and through the narrowest portion of said Venturi tube, means to actuate the other of said arms by the negative logarithmic value of the variations in the specific volume of the air, a rod connected with the fulcrum of said two arms and actuated thereby in accordance with half of the difference between the logarithmic value of said pressure difference and the logarithmic value of said specific air volume, said rod controlling a pressure operated piston, said piston being operatively connected with and controlling in turn simultaneously said fuel pump, said setting device for adjusting the pitch of said propeller, said auxiliary charger motor, said cooling apparatus, and said ignition device, whereby the weight of the fuel is controlled in dependence upon the weight of the air.

11. In combination with an internal combustion engine, a variable pitch propeller driven by said engine, a setting device for adjusting the pitch of said propeller, a charger having an air intake comprising a Venturi tube, an auxiliary motor for driving said charger, a fuel pump, a cooling apparatus for said engine, an ignition device for said engine, a balance beam comprising two arms, a first means including a cam connected with and actuating one of said arms, said first means being controlled by the logarithmic value of the pressure difference of the air passing through the widest part and through the narrowest part of said air intake, a second means including a cam connected with and actuating the other of said arms, said second means being controlled by the negative logarithmic value of the variations in the specific volume of the air and being further controlled by the negative expansion value of said Venturi tube in different air densities, said last mentioned cam being shaped in the form of a curve having superposed the negative logarithmic value of the variations in the specific volume of the air and the negative expansion value of said Venturi tube in different air densities, a rod connected with the fulcrum of said two arms and actuated in accordance with half the difference of the logarithmic value of said pressure difference and logarithmic value of said specific volume of the air and by said negative expansion value, said rod controlling said fuel pump, whereby the weight of the fuel is controlled in dependence upon the weight of the air, said rod being further operatively connected with and controlling simultaneously said setting device for adjusting the pitch of said propeller, said auxiliary charger motor, said cooling apparatus, and said ignition device.

FRITZ GOSSLAU.
JOHANNES SCHMIDT.
WERNER ZARNACK.